United States Patent [19]

Lalin et al.

[11] Patent Number: 5,209,114

[45] Date of Patent: May 11, 1993

[54] RECIPROCATING PISTON FLOW METER

[76] Inventors: Hill S. Lalin, 10 Bonita Terr., Wayne, N.J. 07470; Roman A. Stobnicki, 48 Nestor St., Franklin, N.J. 07416

[21] Appl. No.: 721,126

[22] Filed: Jun. 26, 1991

[51] Int. Cl.[5] .............................................. G01F 3/14
[52] U.S. Cl. ...................................... 73/248; 73/861.05
[58] Field of Search ............... 73/3, 232, 239, 861.05, 73/861, 47, 248

[56] References Cited

U.S. PATENT DOCUMENTS

| 1,618,206 | 2/1927 | Lamb | 73/239 |
|---|---|---|---|
| 3,248,941 | 5/1966 | McArthur | 73/861.05 |
| 3,635,274 | 1/1972 | Rand et al. | 128/2.08 |
| 4,152,922 | 5/1979 | Francisco, Jr. | 73/3 |
| 4,240,291 | 12/1980 | Anderson et al. | 73/861.05 |
| 4,372,147 | 2/1983 | Waugh et al. | 73/3 |
| 4,644,976 | 12/1987 | Peter et al. | 73/861.05 |
| 4,691,577 | 9/1987 | Lalin et al. | 73/861.05 |
| 4,762,004 | 8/1988 | Lalin et al. | 73/861.05 |
| 4,794,785 | 1/1989 | Cohrs et al. | 73/3 |
| 5,052,211 | 10/1991 | Cohrs et al. | 73/3 |

Primary Examiner—Herbert Goldstein
Assistant Examiner—R. L. Biegel

[57] ABSTRACT

A reciprocating piston flow meter for measuring gas flow through the flow meter comprising a hollow precision bore flowtube in a vertical orientation, with a movable piston containing a valve assembly for movement in concert with the piston between one position at or near the bottom end of the flowtube, and an elevated position at or near the upper end of the flowtube. The valve assembly is mechanically activated at each opposite end of the piston stroke to permit the piston to reciprocate between each opposite end in response to the presence of a gas flow.

5 Claims, 6 Drawing Sheets

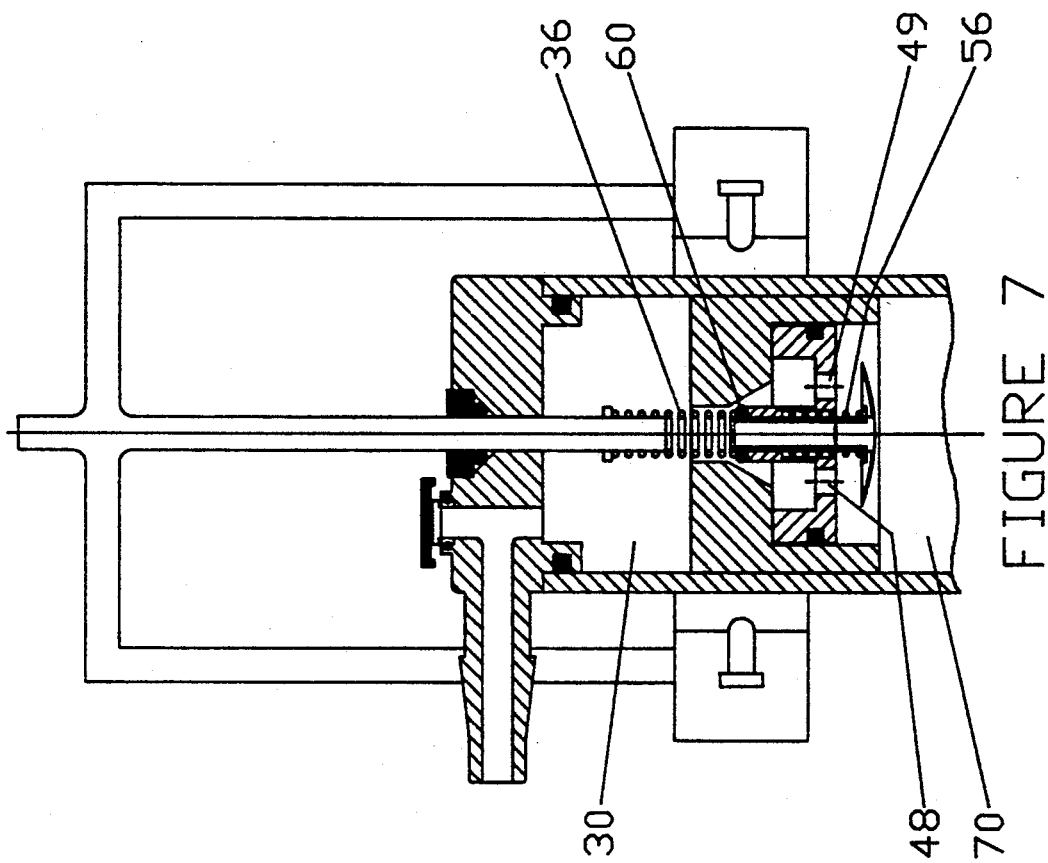
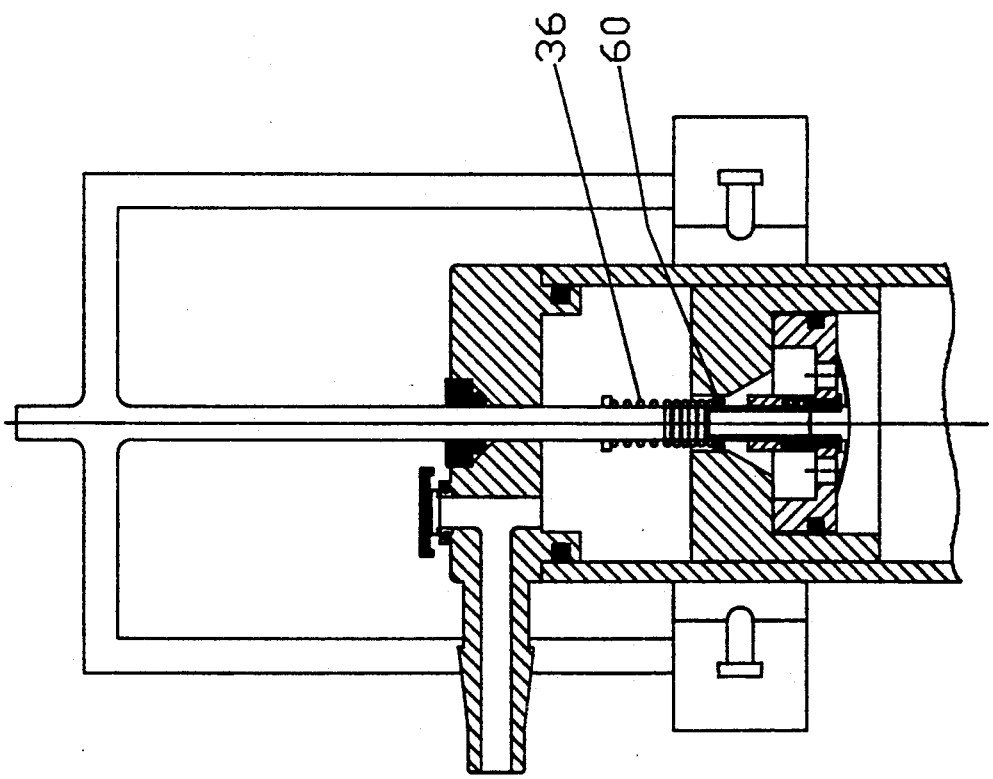

RECIPROCATING PISTON FLOW METER

FIELD OF THE INVENTION

This invention relates to air flow measuring devices using a positive displacement piston flow meter and, more particularly, to a reciprocating piston flow meter for measuring gas flow on a continuous basis.

BACKGROUND OF THE INVENTION

The measurement of gas flow is becoming increasingly more important in the application and control of many processes, as well as in the research laboratory. To assure accuracy in the measurement of gas flow, the flow meter is calibrated against a higher level flow standard. One of the accepted primary standards for gas flow measurement and calibration is the use of a vertically oriented precision bore flowtube and mercury-wetted piston. Although this device is quite precise, it is also very expensive and very large. Another standard for gas flow measurement is the bubble flow meter. In the basic form of the bubble flow meter, a soap film is generated from a soap solution which is propelled by the gas flow under measurement from one end of the flow meter to the other. By timing the rise of the soap film between calibrated volume marks, the volume flow is obtained. Although it is generally agreed that the bubble flow meter accuracy may be affected by changes in ambient conditions such as, humidity and temperature and is dependent upon the gas flow rate, it is understood that these factors can be readily corrected or compensated for in a laboratory setting. This is not, however, as easily done in a field setting or in a commercial process environment. Moreover, the bubble flow meter is a cumbersome and generally unwieldy instrument to use as compared to a reciprocating piston flow meter, particularly under field conditions. A flow meter, which uses a positive displacement piston comparable in operation to the mercury-wetted piston, but substantially smaller in size, weight, and cost, would have substantial utility for field use.

SUMMARY OF THE INVENTION

An improved reciprocating piston flow meter for measuring fluid flow has been developed, in accordance with the present invention, using a vertically oriented flow meter assembly having a movable piston disposed within a precision bore flowtube for reciprocating movement between one position at or near the bottom end of the flowtube and an elevated position near the upper end of the flowtube. The piston contains a valve assembly located within the body of the piston for movement in concert with the piston. The valve assembly in the piston is opened upon reaching the end of the piston stroke corresponding to the elevated position, and is closed upon reaching the opposite end of the piston stroke corresponding to the bottom position. The valve assembly is mechanically activated at each opposite end of the piston stroke to cause the piston to reciprocate in a continuous fashion, or to cause the piston to move from only one end of the piston stroke to another, in response to the presence of a gas flow. Optical detectors are arranged at predetermined positions along the flowtube for detecting the rate of movement of the piston between the predetermined positions.

The reciprocating piston flow meter of the present invention broadly comprises:

(a) a hollow flowtube vertically oriented to form a top and a bottom end;

(b) a piston disposed in said flowtube for movement between a bottom position adjacent said bottom end and an elevated position relative to said top end;

(c) a valve assembly contained in said piston for movement in concert therewith, with said valve assembly having a valve-open and valve-closed position, comprising: a valve body, valve seat(s) for providing fluid access through said piston in the valve-open position, a valve head, and a valve shuttle connected to said valve head for shifting said valve head into the valve-open and valve-closed position, respectively, in response to the relative position of said piston;

(d) means for activating said valve assembly at each opposite end of the piston stroke within said flowtube, such that upon reaching said elevated position, said piston is caused to reverse direction and descend by gravity to said bottom position, and upon reaching said bottom position, is caused to ascend in response to the presence of a fluid flow;

(e) means through which fluid may be introduced into said flow meter, at a flow rate to be measured by said flow meter; and (f) photoelectric sensor means arranged along said flowtube at said bottom position and elevated position, respectively, for detecting the presence of said piston at each such position, respectively.

BRIEF DESCRIPTION OF THE DRAWINGS

Other features and advantages of the present invention will become apparent from the following detailed description of the invention when read in conjunction with the accompanying drawings of which:

FIG. 6 is an enlarged sectional view of the upper end of the flow meter of FIG. 1, with the piston shown at the top end of the piston stroke and the piston valve in the closed position;

FIG. 7 is a view similar to FIG. 6, with the piston valve shown opened; and

DETAILED DESCRIPTION OF THE INVENTION

Figure 1:
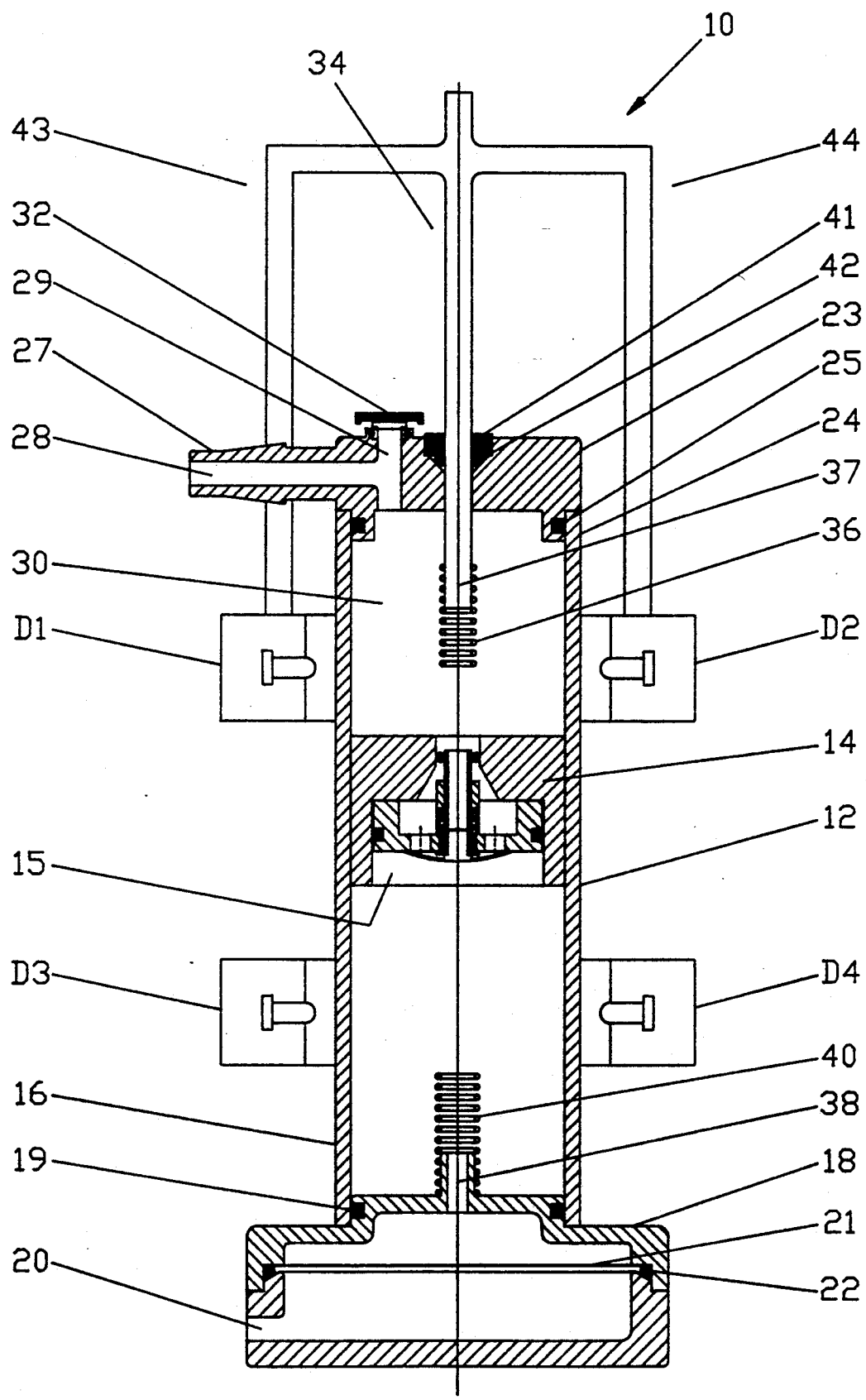
FIG. 1 is a view in vertical section of the preferred embodiment of the piston flow meter of the present invention, with the piston shown in its ascending mode of operation.

The flow meter of the present invention is identified by the reference numeral (10) and is represented in each of the FIGS. (1) through (8), respectively, with its corresponding parts identified by the same reference numbers. The flow meter (10) comprises a hollow cylindrical open-ended precision bore flowtube (12) having a lightweight, smooth surface piston (14) fitted therein to a tight tolerance to provide substantially leakproof and frictionless movement. The piston (14) is composed of a solid material, such as graphite, and contains a valve assembly (15) disposed therein which moves in concert with the piston (14) and reciprocates from the bottom end of the flowtube (12) to an elevated position corresponding to the upper end of the piston stroke and back.

The flowtube (12) is supported in a substantially vertical position with its bottom end (16) mounted upon a platform (18) and sealed by an O-ring (19). The platform (18) has an inlet opening (20) for providing access to the atmosphere. An air filter (21) is used to filter air entering through the inlet opening (20) and is secured by an O-ring (22) against leakage. A cover plate (23) is press fitted into the top end (24) of the flowtube (12) and sealed by an O-ring (25). An outlet fitting (27) extends from the cover plate (23) to an external pump (not shown) for drawing air from the piston flow meter (10). The outlet fitting (27) provides a fluid passageway (28), which communicates through the passageway (29) to the chamber (30) formed between the piston (14) and the top end (24) of the flowtube (12). The passageway (29) extends to a manually controlled switch or poppet valve (32), which normally operates in the closed position, as shown, to permit continuous flow meter operation. In its open position, the passageway (28) is open to the atmosphere through valve (32) for by-passing the flow meter (10). The valve (32) may also be momentarily depressed for a single stroke operation of the piston (14). A solid shaft (34) extends through the cover plate (23) into the area (30), and includes a compression spring (36) mounted over its free end (37) for stopping the piston (14) at the upper end of the piston stroke, and for activating the valve assembly (15), as will be explained in detail hereafter. Likewise, the platform (18) has an upright, hollow member (38) which supports a compression spring (40) for stopping the piston (14) at the lower end of the piston stroke.

The shaft (34) is supported in the cover plate (23) by a retaining plug (41) and an O-ring (42). The shaft is also mechanically connected through the arms (43) and (44) to an upper set of photoelectric sensor elements (D1) and (D2), respectively, which are positioned adjacent to the flowtube (12) to detect the piston (14) when it reaches a height corresponding to the position of the sensor elements (D1) and (D2).

A second set of photoelectric sensor elements (D3) and (D4) are positioned adjacent to the bottom end of the flowtube (12), and are spaced a predetermined distance from the upper set of sensor elements (D1) and (D2). Each set of photoelectric sensor elements may consist of an IR transmitter and receiver, with the position of each set along the flowtube (12) corresponding to each opposite end of the piston stroke. The displaced transit time of the piston (14) between the two sets of sensor elements is used in a conventional manner to calculate fluid flow. All of the photoelectric sensor elements operate in a conventional manner, and are preferably connected to an external electronic control system (not shown) for automatically calculating and recording flow rate. The spacing between the two sets of sensor elements may be mechanically adjusted by depressing or extending the shaft (34) to correspond to different ranges of fluid flow.

Figure 2:
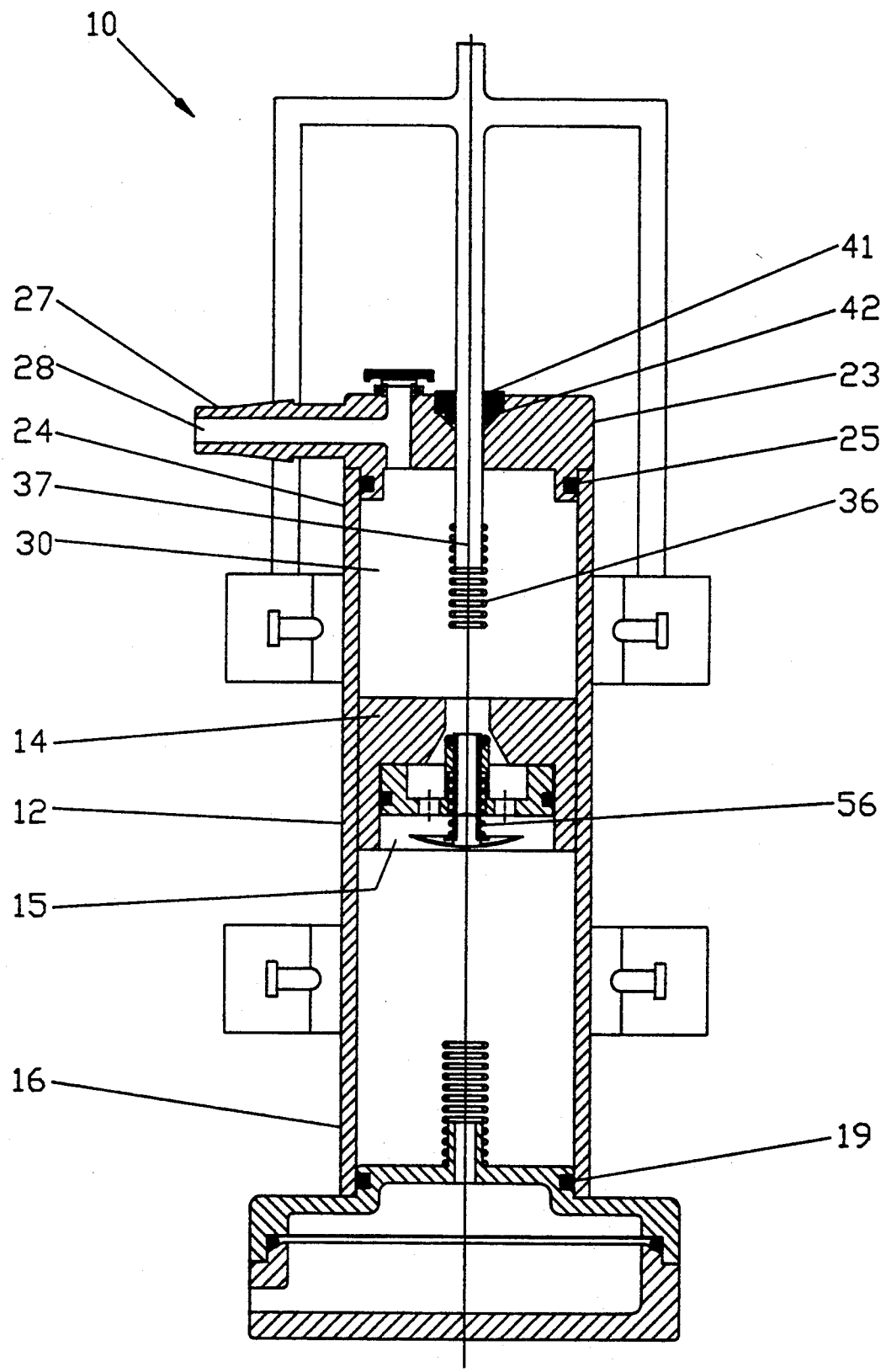
FIG. 2 is a view similar to FIG. 1 with the piston shown in its descending mode of operation.
Figure 2A:
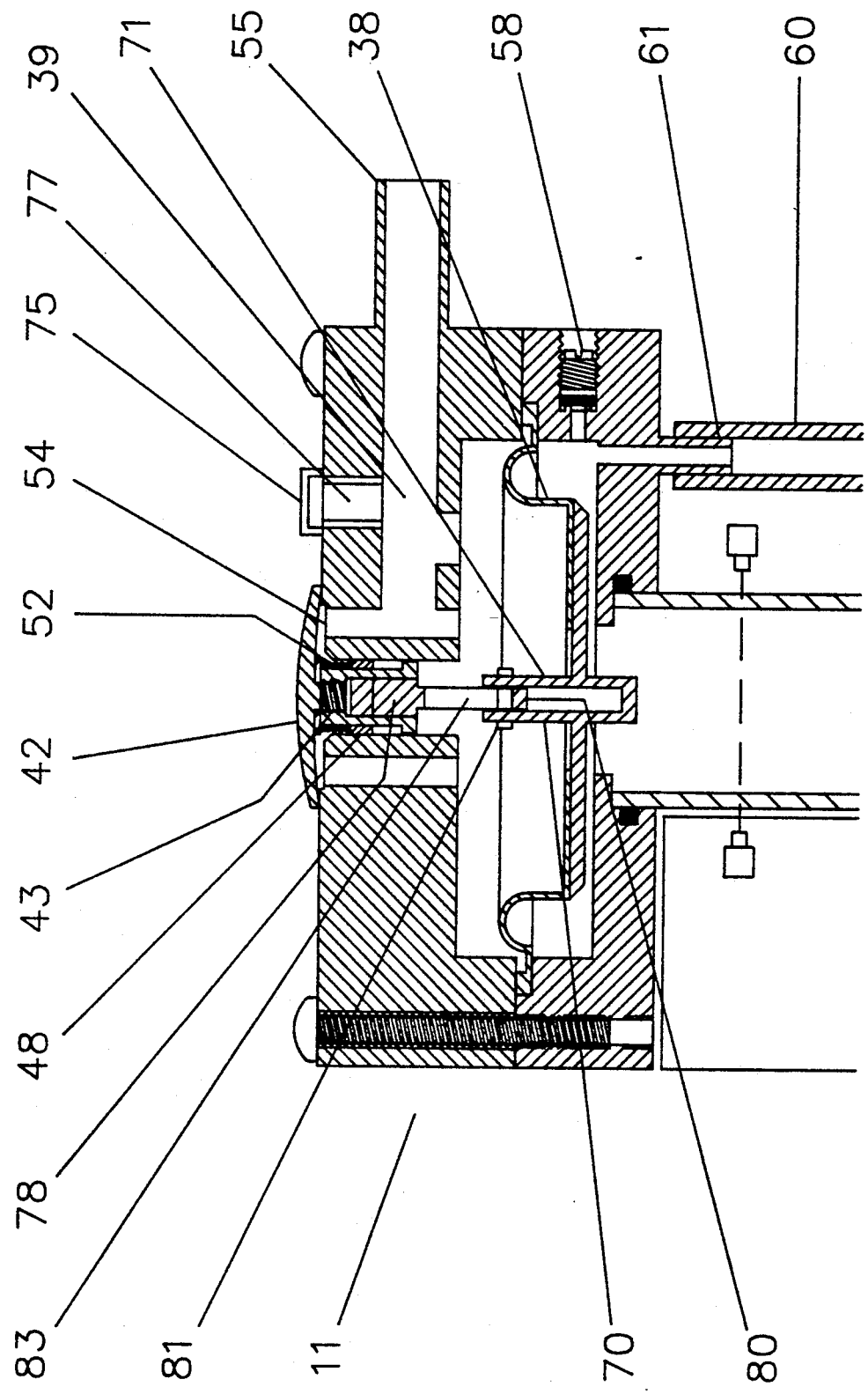
Figure 3:
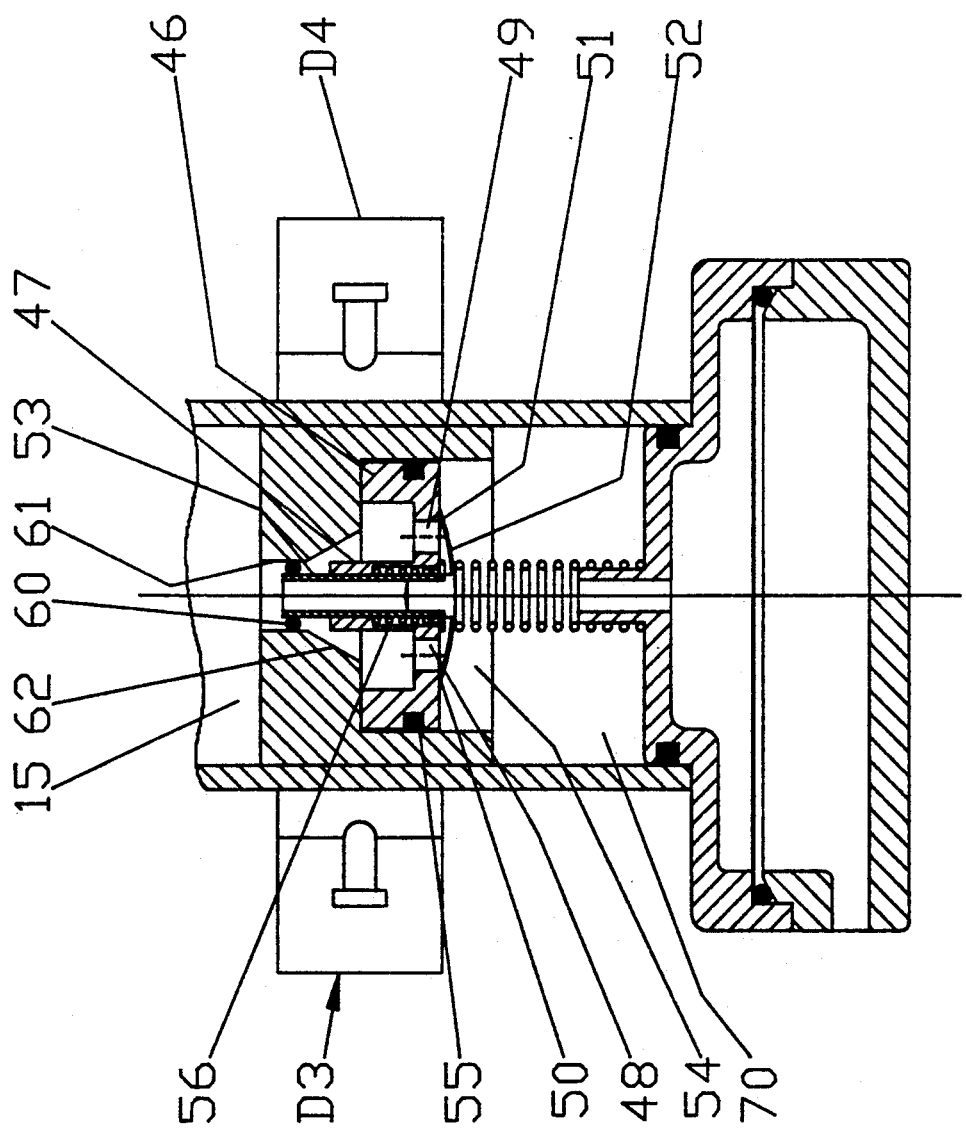
FIG. 3 is an enlarged view of the lower end of the flow meter of FIG. 1, showing the piston at rest at the bottom end of the piston stroke with the piston valve closed.

The valve assembly (15), as is more specifically shown in FIG. 3, includes a valve body (46) having a cylindrical sleeve (47), one or more openings (48) and (49) formed around the cylindrical sleeve (47), valve seats (50) and (51), an elastomeric valve head (52), a valve shuttle (53) extending from the valve head (52) through the sleeve (47), and a compression spring (56) mounted upon the valve shuttle (53) in engagement with the valve head (52). The valve body (46) is press fitted into a bore (54) in the body of the piston (14), and is secured against leakage by an O-ring (55). Alternatively, the valve body (46) may be formed as an integral part of the piston (14). The valve shuttle (53) is longer than the sleeve (47), exposing a free end (53) upon which is mounted a control member (60). The body of the piston (14) includes a cylindrical annulus (61) adjacent the chamber (30), and a tapered annulus (62), which flares outwardly from the cylindrical annulus (61) and has a frusto-conical geometry in cross-section. The control member (60) has a diameter which is substantially equal to the diameter of the annulus (61) for providing a controlled amount of leakage when the control member (60) resides in the annulus (61). The combination of the dual annulus arrangement and the control member (60) functions as a second valve to control the pressure differential across the control member (60) in the ascending mode of operation, which causes the valve shuttle (53) to shift from the valve-closed position, as shown in FIG. 1, to the valve-open position, as shown in FIG. 2. The control member (60) accelerates the shuttle (53) into the full open valve position when the piston (14) is at the top end of the piston stroke, as will hereafter be further explained in greater detail.

Figure 4:
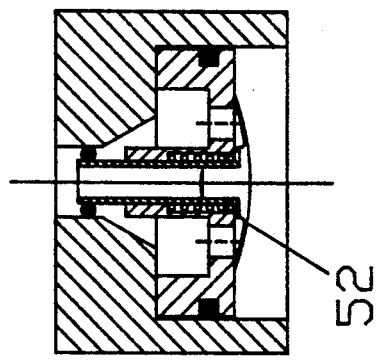
FIG. 4 is an enlarged view of the piston and valve assembly, as shown in FIG. 1, with the valve in the closed position.
Figure 5:
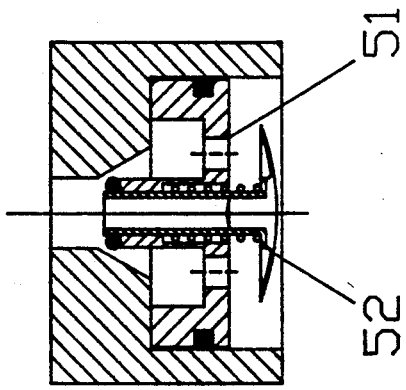
FIG. 5 is an enlarged view, similar to FIG. 4, with the valve shown in the open position.

With the outlet fitting (27) attached to the suction side of a conventional pump and assuming the valve (32) is closed, air is drawn from the chamber (30) above the piston (14), forcing the piston (14) to rise from the bottom position with the valve assembly (15) in its valve-closed position, as shown in FIG. 3 and 4, respectively. The piston (14) continues to rise, as illustrated in FIG. 1, until the control member (60) in the valve assembly (15) engages the spring (36) and forces the valve shuttle (53) to move into the valve-open position with the valve head (52) lifted off the valve seats (50) and (51), as shown in FIGS. 5 and 7, respectively. When the spring (36) engages the control member (60), as shown in FIG. 6, the spring (36) is compressed and the control member (60) is urged to move from the annulus (61) to the annulus (62). At this juncture, pressure has built up in the chamber (30) to cause the compression spring (36) to forcibly move the shuttle (53) to the valve-open position. The increased diameter of annulus (62) provides an open path for fluid flow between the chamber (30) and the lower chamber (70) through the valve openings (48) and (49). The compression spring (36) urges the control member (60) downward until it engages the sleeve (47). Thus, the action of the compressed spring (36) initiates and accelerates the downward movement of the piston (14), which continues to drop by gravity, as illustrated in FIG. 2, until the valve head (52) engages the spring (40) at the bottom end of the flowtube (12). During the descent of the piston (14), the valve head (52) is maintained in the valve-open position by the compression spring (56). Upon contacting the spring (40), the valve head (52) is forced back into the valved-closed position against the force of the compression spring (56) and the cycle repeats itself, causing the piston to ascend, assuming the valve (32) has not been opened.

Figure 8:
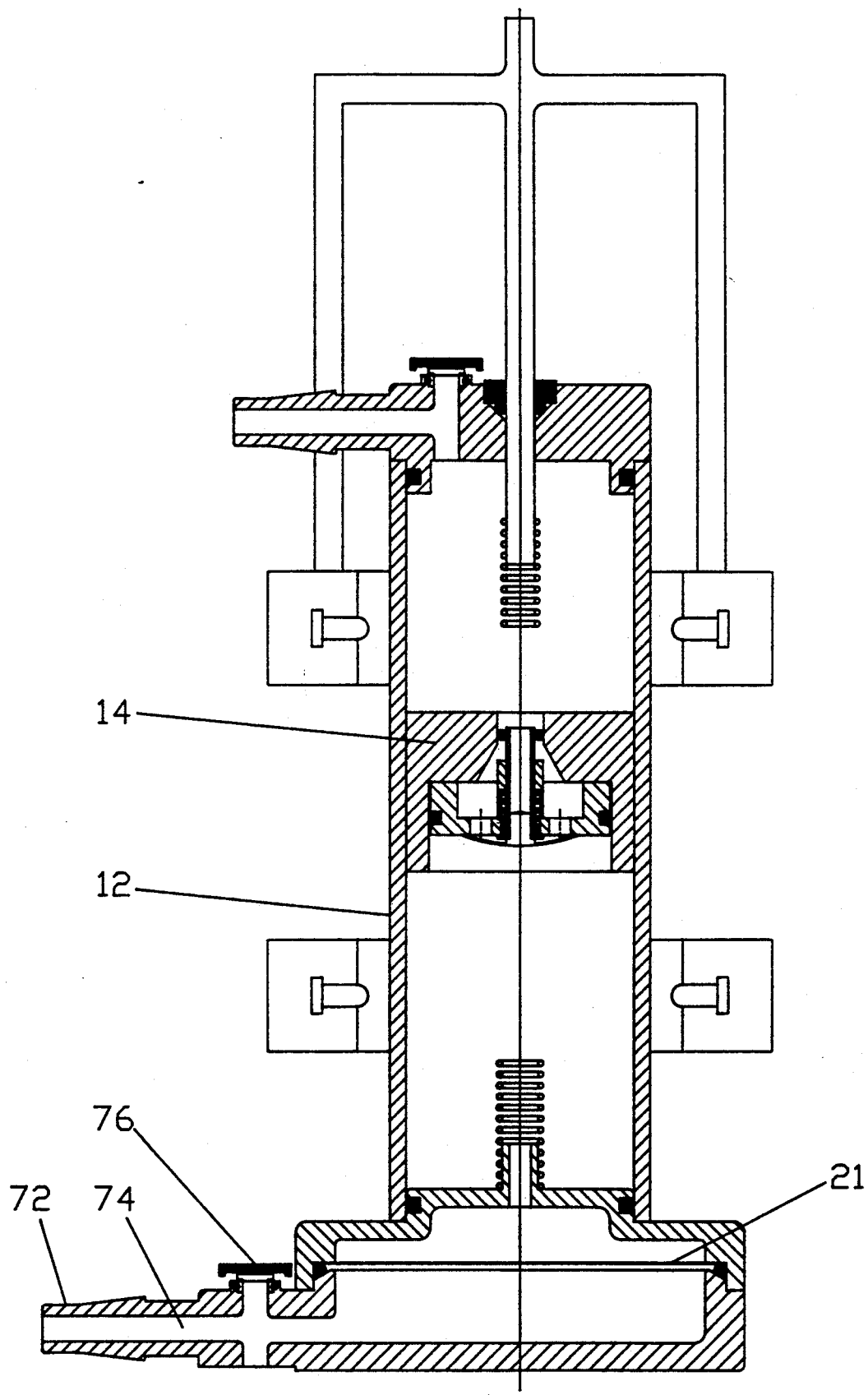
FIG. 8 is a view in vertical section of an alternate embodiment of the piston flow meter of the present invention in which the flow meter can be operated by negative or positive pressure.

In the embodiment of FIG. 8, an additional fitting (72) is used to provide positive fluid flow into the flow meter (10) through passageway (74). The air flows through the passageway (74), past the air filter (21), into the flowtube (12), pushing the piston (14) upward until the piston (14) reaches the top of the piston stroke and the valve assembly is activated to open the valve, thereby causing the piston (14) to drop to the lower position, as explained heretofore. A switch or normally closed poppet valve (76) may also be used to provide a bypass for the flow meter (10).

What is claimed is:

1. A reciprocating piston flow meter for use in measuring air flow through the flow meter comprising:
   (a) a hollow flowtube vertically oriented to form an open top end and an open bottom end, with one end connected to the atmosphere;
   (b) means for connecting the opposite end of said flowtube to an external pump for directing a flow of air through said flowtube;
   (c) a piston disposed in said flowtube for movement between a bottom position adjacent said bottom end and an elevated position relative to said top end;
   (d) a valve assembly contained in said piston for movement in concert therewith, with said valve assembly comprising: a valve body, valve seat(s), a valve head having a valve-open and a valve-closed position, and a valve shuttle connected to said valve head for shifting said valve head into the valve-open and valve-closed position, respectively, in response to the relative position of said piston;
   (e) means disposed at each opposite end of said flowtube for moving said valve shuttle in said valve assembly, such that when said piston reaches said elevated position, said valve head is shifted into said valve-open position for causing said piston to reverse direction and descend by gravity to said bottom position, and upon reaching said bottom position, said valve head is shifted into said valve-closed position for causing said piston to ascend in response to the presence of said air flow; and
   (f) photoelectric sensor means arranged along said flowtube for detecting the passage of said piston between two predetermined locations.

2. A reciprocating piston flow meter, as defined in claim 1, wherein said piston includes an annulus of predetermined configuration, into which said valve shuttle extends when said valve head is in the valve-closed position.

3. A reciprocating piston flow meter, as defined in claim 2, wherein said valve assembly further comprises a control member surrounding one end of said valve shuttle, for engaging said activating means at said elevated position to open said valve assembly.

4. A reciprocating piston flow meter, as defined in claim 3, wherein said annulus has at least one section with a flared geometry.

5. A reciprocating piston flow meter, as defined in claim 4, wherein said activating means comprises a spring.

* * * * *